May 10, 1949.  W. A. BERRY  2,469,760
STAKE RELEASING MEANS FOR VEHICLE LOG BUNKS
Filed Feb. 11, 1947
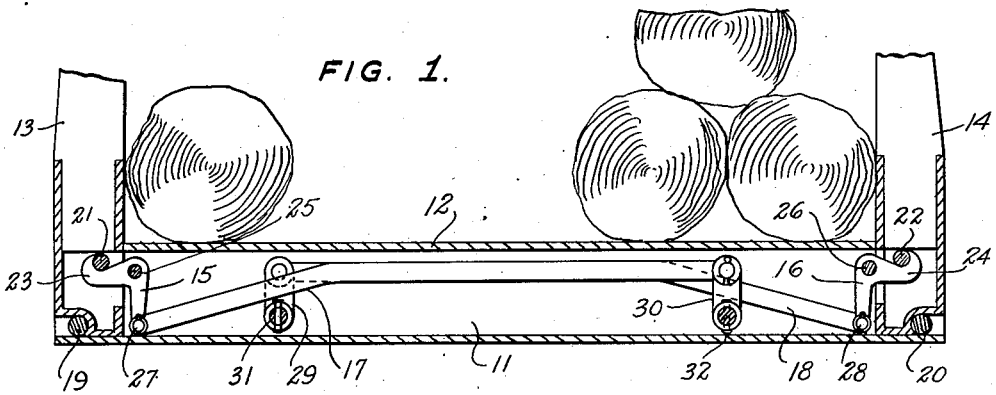
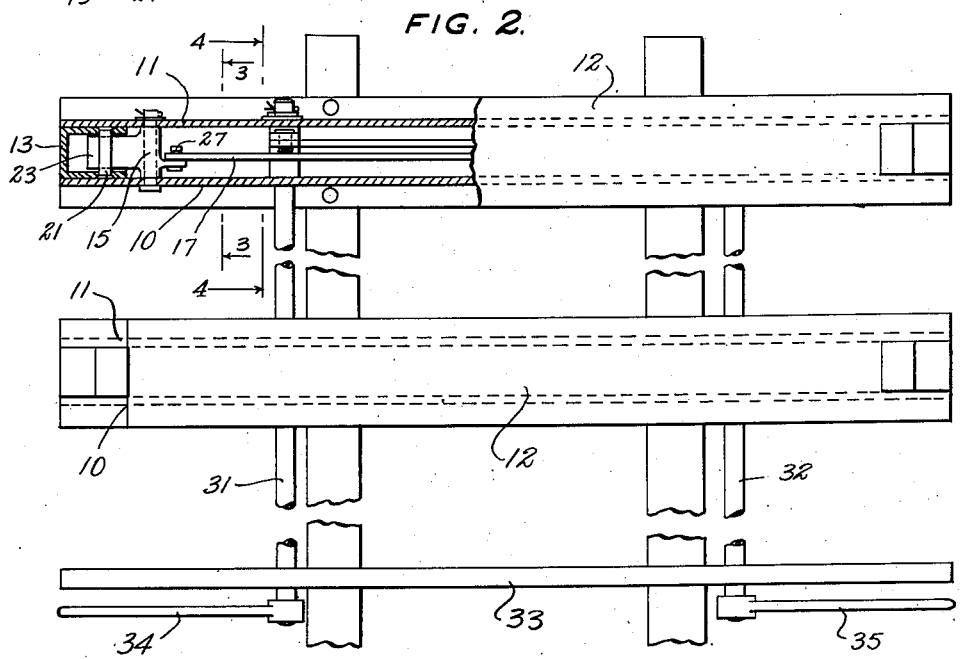
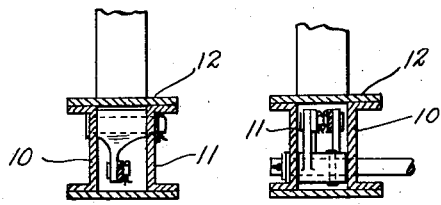
INVENTOR.
WILLIAM A. BERRY,
BY
*W. Morrow, Berman & Davidson*
ATTORNEY.

Patented May 10, 1949

2,469,760

UNITED STATES PATENT OFFICE 2,469,760

STAKE RELEASING MEANS FOR VEHICLE LOG BUNKS

William A. Berry, Essex Junction, Vt.

Application February 11, 1947, Serial No. 727,769

1 Claim. (Cl. 280—145)

This invention relates to log hauling trucks, trailers, and the like wherein logs are piled longitudinally on flat platforms of the motor vehicles and held at the sides by stakes and the like, and in particular bunks for holding the logs which are positioned transversely on the platforms of the vehicles and provided with mechanically actuated stakes that may be dropped downward out of the way from the cab of the vehicle wherein the operator is out of the path of the rolling released logs and, therefore, out of danger.

The purpose of this invention is to provide a safety log bunk for log hauling motor vehicles wherein the logs may be released from a remote point.

Logs are usually held on log hauling trucks by stakes in sockets along the sides of the platforms of the vehicles and to release or dump the logs it is necessary for the logger or operator to pull out the stakes and the legs of many operators are broken each year because, after pulling out the stakes, they do not have time to get out of the way of the rolling released logs. With this thought in mind this invention contemplates log bunks placed across the body of a truck on which the logs are stacked, and the bunks are provided with hinged stakes, which are held by latches that may be actuated to release the stakes from the end of the truck body instead of along the side.

The object of this invention is, therefore, to provide means for mechanically actuating hinged stakes at the ends of log bunks for motor log hauling vehicles wherein the stakes are positively held upright and adapted to be released from a remote point.

Another object of the invention is to provide safety log holding bunks for log hauling trucks and the like which may be used on substantially any truck adapted to haul logs.

A further object of the invention is to provide a safety log holding bunk having hinged stakes held upright by releasable latches which is of a simple and economical construction.

With these and other objects in view the invention embodies a bunk adapted to be placed across a truck body formed of spaced channels with stakes hinged between the ends of the channels, and latches for holding the stakes upright wherein the latches may be actuated to release the stakes from the end of the truck body.

Other features and advantages of the invention will appear from the following description taken in connection with the drawings, wherein:

Figure 1 is a longitudinal section through one of the bunks showing the relative positions of the parts, with the upper ends of the stakes broken away.

Figure 2 is a plan view illustrating a pair of the bunks in combination with a head board with a cover plate of one of the bunks broken away showing parts thereof in section and with the bunks comparatively close together for the purpose of illustration.

Figure 3 is a cross section through a bunk showing a stake mounting thereof on line 3—3 of Figure 2.

Figure 4 is a cross section on line 4—4 of Figure 2 also showing a section through a bunk and illustrating the stake latch actuating levers.

Referring now to the drawings wherein like reference characters indicate corresponding parts the log bunk of this invention includes bolsters, each embodying a pair of structural channel beams 10 and 11. The bunk further embodies a cover plate 12, stakes 13 and 14, latches 15 and 16, actuating levers 17 and 18, and associated instrumentalities for operating the parts.

The stakes are pivotally mounted in the ends of the beams on pins 19 and 20, and pins 21 and 22 are provided in the stakes, spaced from the ends, over which hooks 23 and 24 at the ends of the latches 15 and 16 are engaged to hold the stakes in upright positions. The latches are pivotally mounted on pins 25 and 26 and their opposite ends are pivotally attached to the ends of the actuating levers 17 and 18 by pins or studs 27 and 28 as shown. The opposite ends of the levers 17 and 18 are pivotally connected to the ends of links 30 and 29, and the opposite ends of the links are fixedly attached to shafts 31 and 32, which extend lengthwise of the platform of the truck and through the bunks on the platform as shown in Figure 2. A headboard 33 may be provided at the forward end of the platform and the ends of the shafts extend through the headboard where they are provided with actuating handles 34 and 35.

It will be noted in Figure 1 that the stakes are normally held upright by the latches and levers and when it is desired to lower the stakes on one side of the truck to release the logs, the lever at the end of the shaft on the opposite side of the truck is moved downward and this will draw the downwardly extending end of the latch of each bunk inward wherein the outer ends of the latches will move downward to release the pins 21 or 22, thereby releasing the stakes. After the logs have been removed from the bunks the stakes are set upright and the handles are pulled upward to actuate the hooks at the ends of the latches to holding positions with the pins of the stakes.

The bunk is illustrated in the preferred form, however, it will be understood that modifications may be made in the design or arrangement of the parts without departing from the spirit of the invention.

What is claimed is:

In a log bunk for holding logs on a vehicle platform, at least two bolsters arranged in spaced relation and mounted on said platform, each of said bolsters embodying a pair of spaced, parallel channel beams supported on said platform, a stake interposed between said pair of beams adjacent the ends thereof and mounted for pivotal movement about a horizontal axis, a horizontally disposed pin carried by said stake, a latch positioned between said beams adjacent said stake and pivotally connected to said beams, there being a hook on one end of said latch for engaging said pin, a stud secured to the other end of said latch, a lever connected to said stud, and manually-operable means connected to said lever for actuating the latter, said last-named means comprising a link having one end pivotally connected to said lever, a horizontally disposed shaft arranged at right angles with respect to said link and having one end secured to the other end of the latter, and an actuating handle secured to the other end of said shaft.

WILLIAM A. BERRY.

REFERENCES CITED

The following references are of record in the file of this patent:

UNITED STATES PATENTS

| Number | Name | Date |
| --- | --- | --- |
| 838,980 | Gray | Dec. 18, 1906 |
| 940,262 | Majette | Nov. 16, 1909 |
| 1,454,037 | Byrne | May 8, 1923 |
| 2,131,337 | Swertfeger | Sept. 27, 1938 |
| 2,210,614 | Boyer | Aug. 6, 1940 |